United States Patent
Lu et al.

(10) Patent No.: US 11,044,435 B2
(45) Date of Patent: Jun. 22, 2021

(54) DRIVER CIRCUIT AND PROJECTOR INCLUDING VOLTAGE CONVERSION UNITS AT PRIMARY SIDE

(71) Applicant: QISDA CORPORATION, Taoyuan (TW)

(72) Inventors: Fang-Chieh Lu, New Taipei (TW); Chi-Jen Chen, Taoyuan (TW); Chuan-Chu Chen, Taoyuan (TW); Ching-Ying Tsou, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 16/429,047

(22) Filed: Jun. 2, 2019

(65) Prior Publication Data
US 2020/0145605 A1    May 7, 2020

(30) Foreign Application Priority Data
Nov. 5, 2018  (CN) .......................... 201811309211.8

(51) Int. Cl.
| H04N 5/63 | (2006.01) |
| G03B 21/14 | (2006.01) |
| G03B 21/20 | (2006.01) |
| H04N 7/04 | (2006.01) |
| H04N 9/31 | (2006.01) |

(52) U.S. Cl.
CPC .............. *H04N 5/63* (2013.01); *G03B 21/145* (2013.01); *G03B 21/2053* (2013.01); *H04N 7/04* (2013.01); *H04N 9/3155* (2013.01)

(58) Field of Classification Search
CPC .......... H04N 5/63; H04N 7/04; H04N 9/3155; G03B 21/145; G03B 21/2053
USPC .......................................................... 348/759
See application file for complete search history.

(56) References Cited

U.S. PATENT DOCUMENTS

| 10,091,473 | B1* | 10/2018 | Chen .................. G03B 21/2053 |
| 10,790,693 | B2* | 9/2020 | Bae ......................... H02J 7/045 |
| 2004/0090392 | A1* | 5/2004 | Chen ................ H04N 21/43637 345/2.3 |
| 2014/0221740 | A1* | 8/2014 | Kawula .................... A61B 1/07 600/109 |

FOREIGN PATENT DOCUMENTS

| CN | 101493643 A | 7/2009 |
| CN | 102843027 A | 12/2012 |
| CN | 107567132 A | 1/2018 |

* cited by examiner

*Primary Examiner* — John W Miller
*Assistant Examiner* — Omer Khalid

(57) ABSTRACT

A driver circuit includes a first voltage conversion unit, a second voltage conversion unit, a third voltage conversion unit, a light driver and a control circuit. The first voltage conversion unit may convert a first voltage to a second voltage. The second voltage conversion unit may convert the second voltage to a third voltage in a non-electrically isolated manner. The third voltage conversion unit may convert the second voltage to a fourth voltage in a non-electrically isolated manner. The light driver may receive the third voltage and a control signal to generate a control current according to the control signal. The control circuit may receive the fourth voltage and an image signal to generate the control signal according to the image signal.

7 Claims, 4 Drawing Sheets

DRIVER CIRCUIT AND PROJECTOR INCLUDING VOLTAGE CONVERSION UNITS AT PRIMARY SIDE

BACKGROUND OF THE INVENTION

1. Field of the Invention

The disclosure is related to a driver circuit and a projector, and more particularly, a driver circuit and a projector including voltage conversion units at a primary side.

2. Description of the Prior Art

In current applications, projecting content to be displayed on a display screen by means of a projector for users to watch has been in common use in the display field. In a driver circuit of a projector, it is often needed to embed a voltage converter to perform voltage conversion. For example, an LLC resonant voltage converter may be used to perform voltage conversion for converting a high voltage to a low voltage to provide power to another circuit.

However, in order to comply with safety regulations, there must be electrical isolation in a voltage converter. An isolation distance of the electrical isolation has to comply with related regulations, and a circuit is therefore divided into a primary side and a secondary side. Portions that a user may touch should be at the secondary side to ensure the safety of the user.

Because it is difficult to avoid using a voltage converter with electrical isolation, the abovementioned structure will result in difficulties of improving the power conversion efficiency and reducing the circuit size and circuit complexity.

SUMMARY OF THE INVENTION

An embodiment provides a driver circuit including a first voltage conversion unit, a second voltage conversion unit, a third voltage conversion unit, a light source driver and a control circuit. The first voltage conversion unit may be used to convert a first voltage to a second voltage. The first voltage conversion unit may include an input terminal used to receive the first voltage and an output terminal used to output the second voltage. The second voltage conversion unit may be used to convert the second voltage to a third voltage in a non-electrically isolated manner. The second voltage conversion unit may include an input terminal used to receive the second voltage and an output terminal used to output the third voltage. The third voltage conversion unit may be used to convert the second voltage to a fourth voltage in a non-electrically isolated manner. The third voltage conversion unit may include an input terminal used to receive the second voltage and an output terminal used to output the fourth voltage. The light source driver may be used to receive the third voltage and a control signal to generate a control current according to the control signal. The light source driver may include a first terminal coupled to the output terminal of the second voltage conversion unit and used to receive the third voltage, a second terminal used to receive the control signal and an output terminal used to output the control current. The control circuit may be used to receive the fourth voltage and an image signal and generate the control signal according to the image signal. The control circuit may include a first terminal coupled to the output terminal of the third voltage conversion unit, a second terminal used to receive the image signal and an output terminal used to output the control signal.

Another embodiment provides a projector including a housing, a first voltage conversion unit, a light source driver, a light source, a second voltage conversion unit and a control circuit module. The housing may include a power interface and a light outlet. The first voltage conversion unit may be electrically connected to the power interface and used to boost a first voltage inputted from the power interface to a second voltage. The light source driver may be used to receive the second voltage and generate a control current according to a control signal. The light source may be used to generate light according to the control current. The second voltage conversion unit may be used to step down the second voltage to a third voltage in a non-electrically isolated manner. The second voltage conversion unit may include an input terminal used to receive the second voltage, and an output terminal used to output the third voltage. The control circuit module may include an image processing unit and an image generating unit. An operation voltage of the control circuit module is provided by the third voltage. The image processing unit may control the image generating unit according to an image signal. The light may be projected to the image generating unit to generate an image beam. The image beam may be projected out of the housing from the light outlet.

Another embodiment provides a driver circuit including a first voltage conversion unit, a second voltage conversion unit, a light source driver and a control circuit. The first voltage conversion unit may be used to convert a first voltage to a second voltage. The first voltage conversion unit may include an input terminal used to receive the first voltage and an output terminal used to output the second voltage. The second voltage conversion unit may be used to convert the second voltage to a third voltage in a non-electrically isolated manner. The second voltage conversion unit may include an input terminal used to receive the second voltage and an output terminal used to output the third voltage. The light source driver may be used to receive the second voltage and a control signal to generate a control current according to the control signal. The light source driver may include a first terminal coupled to the output terminal of the first voltage conversion unit and used to receive the second voltage, a second terminal used to receive the control signal and an output terminal used to output the control current. The control circuit may be used to receive the third voltage and an image signal and generate the control signal according to the image signal. The control circuit may include a first terminal coupled to the output terminal of the second voltage conversion unit, a second terminal used to receive the image signal and an output terminal used to output the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
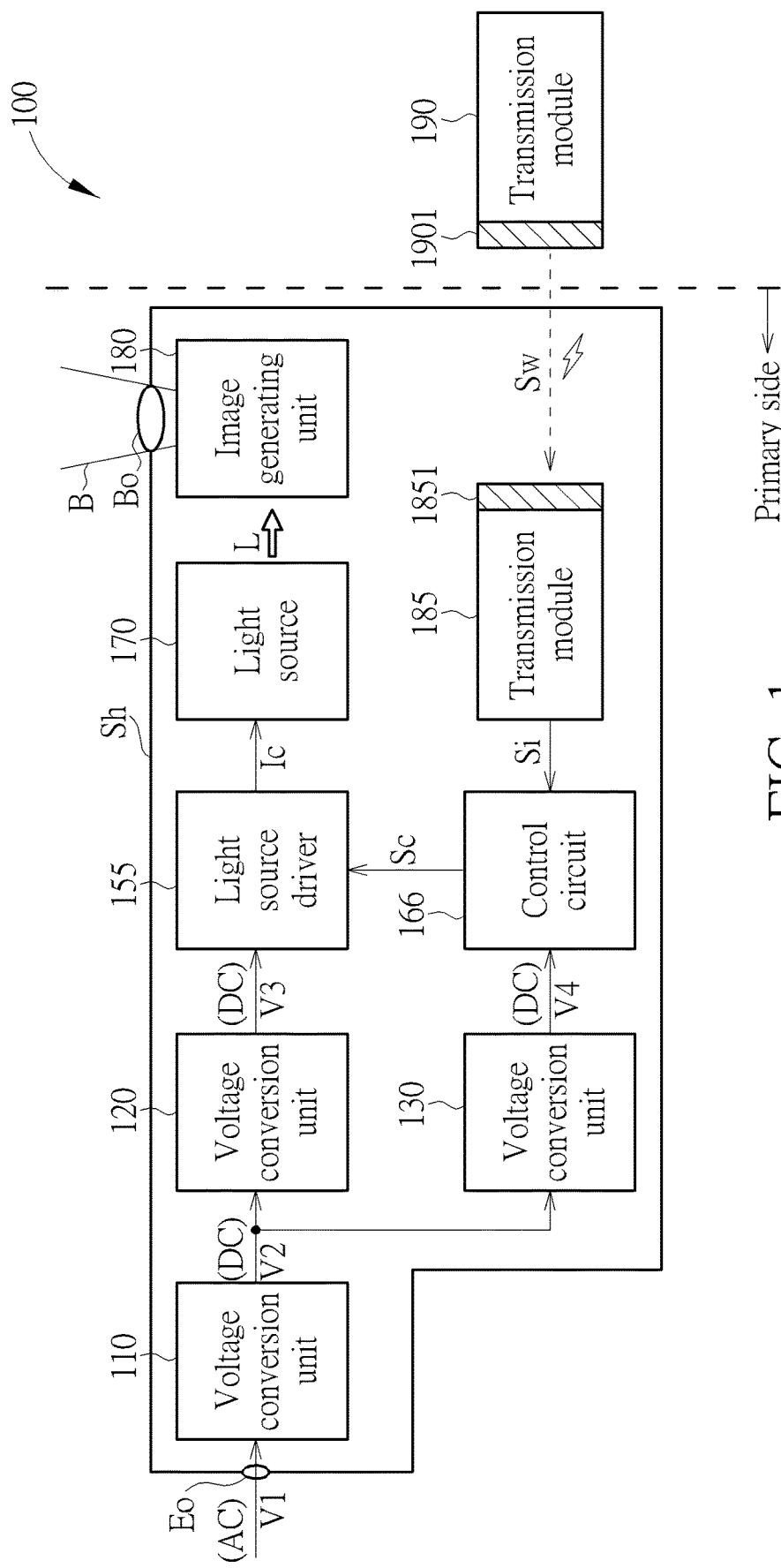
FIG. 1 illustrates a driver circuit according to an embodiment.

FIG. 1 illustrates a driver circuit 100 according to an embodiment. The driver circuit 100 may include a voltage conversion unit 110, a voltage conversion unit 120, a voltage conversion unit 130, a light source driver 155 and a control circuit 166.

The voltage conversion unit 110 may be used to convert a voltage V1 to a voltage V2. The voltage conversion unit 110 may include an input terminal used to receive the voltage V1 and an output terminal used to output the voltage V2. The voltage conversion unit 120 may be used to convert the voltage V2 to a voltage V3. The voltage conversion unit 120 may include an input terminal used to receive the voltage V2 and an output terminal used to output the voltage V3, where the voltage conversion unit 120 may perform voltage conversion in a non-electrically isolated manner. The voltage conversion unit 130 may be used to convert the voltage V2 to a voltage V4. The voltage conversion unit 130 may include an input terminal used to receive the voltage V2 and an output terminal used to output the voltage V4 where the voltage conversion unit 130 may perform voltage conversion in a non-electrically isolated manner. In other words, inside each of the voltage conversion units 120 and 130, it is unnecessary to embed two coils separated with an isolation distance. Hence, each of the voltage conversion units 120 and 130 may be at a primary side.

The light source driver 155 may be used to receive the voltage V3 and a control signal Sc to generate a control current Ic according to the control signal Sc. The light source driver 155 may include a first terminal coupled to the output terminal of the voltage conversion unit 120 and used to receive the voltage V3, a second terminal used to receive the control signal Sc and an output terminal used to output the control current Ic. The control circuit 166 may be used to receive the voltage V4 and an image signal Si and generate the control signal Sc according to the image signal Si. The control circuit 166 may include a first terminal coupled to the output terminal of the voltage conversion unit 130, a second terminal used to receive the image signal Si and an output terminal used to output the control signal Sc.

According to an embodiment, the voltage V1 may be an alternating-current (AC) voltage, and the voltages V2, V3 and V4 may be direct-current (DC) voltages. For example, the voltage V1 may be a mains voltage providing AC 220V or AC 110V. The voltage V2 may be DC 380V. The voltage V3 may be DC 50V or DC 380V. The voltage V4 may be DC 3.3V or DC 12V. The abovementioned voltage values are merely examples instead of limiting the scope of embodiments.

According to an embodiment, the voltage conversion unit 110 may be a power factor correction (PFC) voltage conversion unit. According to an embodiment, each of the voltage conversion units 120 and 130 may be a non-isolated voltage converter. For example, each of the voltage conversion units 120 and 130 may include a buck voltage converter, a buck-boost voltage converter, a boost-buck voltage converter, a boost voltage converter, a Cuk voltage converter, a SEPIC voltage converter, a ZETA voltage converter or a charge pump voltage converter.

As shown in FIG. 1, the driver circuit 100 may further include a light source 170 and an image generating unit 180. The light source 170 may be used to generate light L according to the control current Ic. The light L may be projected onto the image generating unit 180 and be reflected or passed to generate an image beam B.

According to an embodiment, the driver circuit 100 may further include a housing Sh. The housing Sh may include a power interface Eo and a light outlet Bo. The power interface Eo may be coupled to the input terminal of the voltage conversion unit 110 and used to receive the voltage V1, and the image beam B may be projected out of the housing Sh from the light outlet Bo.

As shown in FIG. 1, according to an embodiment, the driver circuit 100 may further include a transmission module 185. The transmission module 185 may include an output terminal coupled to the second terminal of the control circuit 166 and used to output the image signal Si, and a wireless transmission interface 1851 used to receive a wireless image signal Sw wherein the image signal Si may be generated according to the wireless image signal Sw. The driver circuit 100 may further include a transmission module 190. The transmission module 190 may include a wireless transmission interface 1901 used to transmit the wireless image signal Sw.

For example, the transmission module 190 may be a device with a wireless transmission function such as a mobile phone, a tablet computer, a notebook computer, a portable device or a computer device externally connected to a wireless transmission device. Hence, content to be projected (e.g., pictures, text, video, slides) and related control signals (e.g., changing page number of slides, pausing a video, playing a video, adjusting brightness) may be transmitted to the transmission module 180 using the wireless image signal Sw to perform image projection and related controls.

Figure 2:
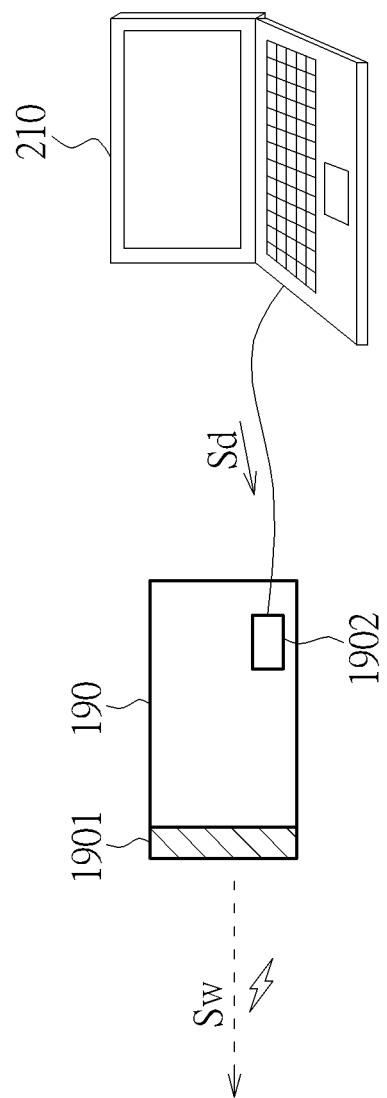
FIG. 2 illustrates that the transmission module includes a connection terminal according to an embodiment.

FIG. 2 illustrates that the transmission module 190 includes a connection terminal 1902 according to an embodiment. According to an embodiment, the transmission module 190 may further optionally include the connection terminal 1902 used to receive external image data Sd for the transmission module 190 to generate the wireless image signal Sw according to the external image data Sd. The external image data Sd may correspond to projection data to be projected.

For example, as shown in FIG. 2, the connection terminal 1902 may be a connection port supporting high definition multimedia interface (HDMI), digital visual interface (DVI), universal serial bus (USB) or video graphics array (VGA). The connection terminal 1902 may be coupled to a device 210 to obtain the projection data carried by the image data Sd. The device 210 may be a mobile phone, a tablet computer, a laptop computer or a flash drive.

As shown in FIG. 1, because there may be no electrical isolation inside each of the voltage conversion units 110, 120 and 130, the voltage conversion units 110, 120 and 130, the light source driver 155 and the control circuit 166 may be at a primary side. In other words, according to an embodiment, all portions except the transmission module 190 of the driver circuit 100 may be at the primary side. Because a user may execute related controls merely using the transmission module 190, the user may not touch the circuit at the primary side, and the safety of the user may be guaranteed.

Because it is unnecessary to use voltage conversion units with electrical isolation, the power conversion efficiency may be improved, and the circuit size and circuit complexity may be reduced. For example, compared with using voltage conversion units with electrical isolation (e.g., LLC resonant voltage converters), using a driver circuit provided by an embodiment may increase the power conversion efficiency from 78% to 84%, reducing the circuit size by more than 15% and reducing manufacture cost by more than 11%.

Figure 3:
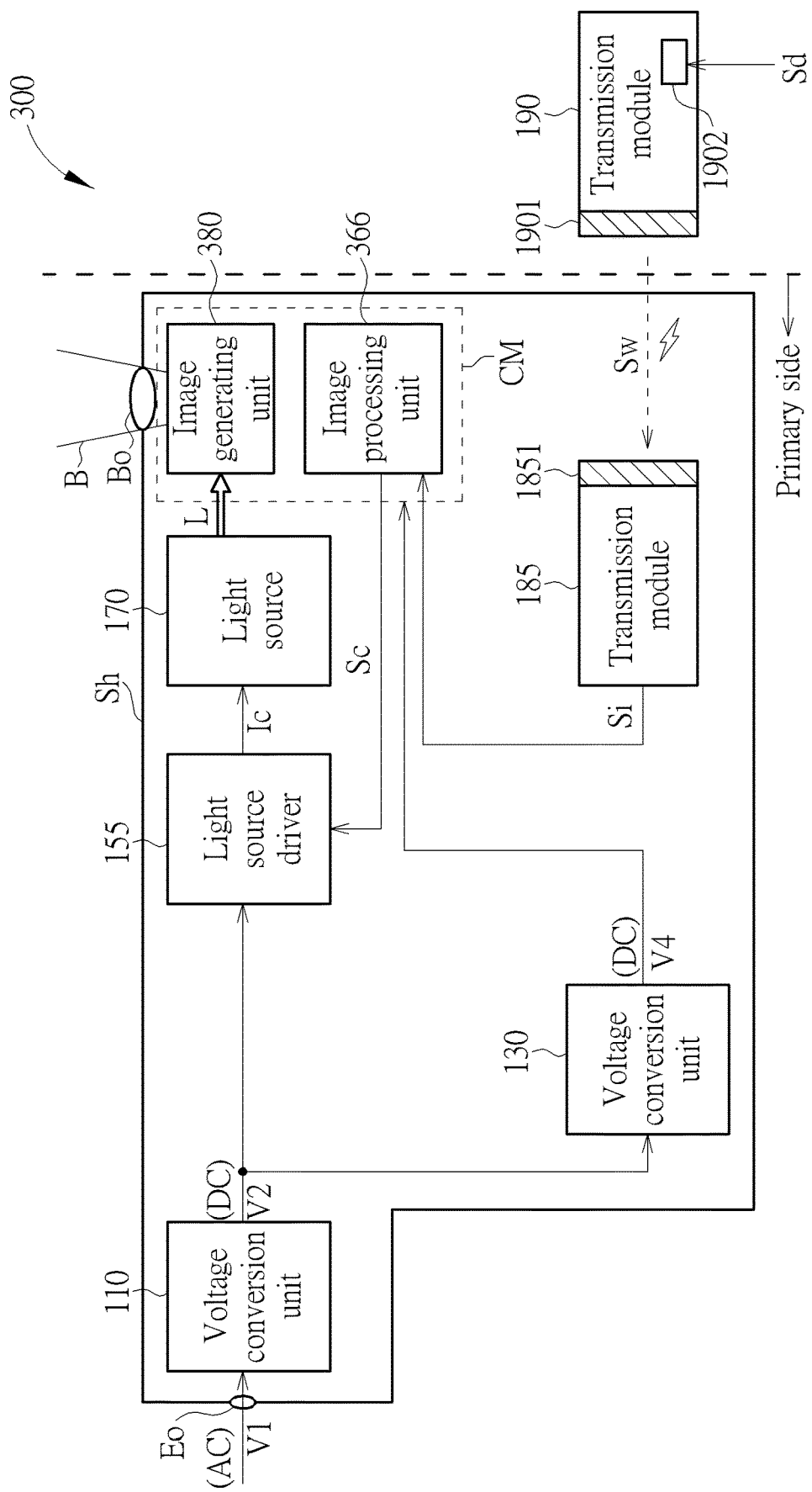
FIG. 3 illustrates a projector according to an embodiment.

FIG. 3 illustrates a projector 300 according to an embodiment. The projector 300 may include a housing Sh, a voltage conversion unit 110, a light source driver 155, a light source 170, a voltage conversion unit 130 and a control circuit module CM. The housing Sh may include a power interface Eo and a light outlet Bo. The voltage conversion unit 110 may be electrically connected to the power interface Eo and used to boost a voltage V1 inputted from the power interface Eo to a voltage V2. The light source driver 155 may be used to receive the voltage V2 and generate a control current Ic according to a control signal Sc. The light source 170 may be used to generate light L according to the control current Ic. The voltage conversion unit 130 may be used to step down the voltage V2 to a voltage V4. The voltage conversion unit 130 may include an input terminal used to receive the voltage V2, and an output terminal used to output the voltage V4 where the voltage conversion unit 130 may perform voltage conversion in a non-electrically isolated manner. The control circuit module CM may include an image processing unit 366 and an image generating unit 380. An operation voltage of the control circuit module CM may be provided by the voltage V4. The image processing unit 366 may control the image generating unit 380 according to an image signal Si. The light L may be projected to the image generating unit 380 and reflected/passed to generate an image beam B, and the image beam B may be projected out of the housing Sh from the light outlet Bo to project images. The image generating unit 380 may be a DMD (Digital Micro-mirror Device) chip in a DLP (Digital Light Processing) projector or an LCD (liquid-crystal display) assembly in an LCD projector.

As shown in FIG. 3, the projector 300 may further include a wireless transmission module 185 disposed in the housing Sh. The wireless transmission module 185 may be used to receive a wireless image signal Sw and convert the wireless image signal Sw to generate the image signal Si.

According to an embodiment, as shown in FIG. 3, the projector 300 may further include a wireless transmission module 190 used to transmit the wireless image signal Sw. The wireless transmission module 190 may optionally include a connection terminal 1902 used to receive external image data Sd, and the wireless transmission module 190 may convert the external image data Sd to the wireless image signal Sw. The external image data Sd may correspond to projection data to be projected.

As shown in FIG. 1 and FIG. 3, the projector 300 of FIG. 3 may be similar to the driver circuit 100 of FIG. 1. However, the projector 300 may not include the voltage conversion unit 120 shown in FIG. 1, so the circuit size may be further reduced. The similarities of FIG. 1 and FIG. 3 are not repeatedly described herein.

Figure 4:
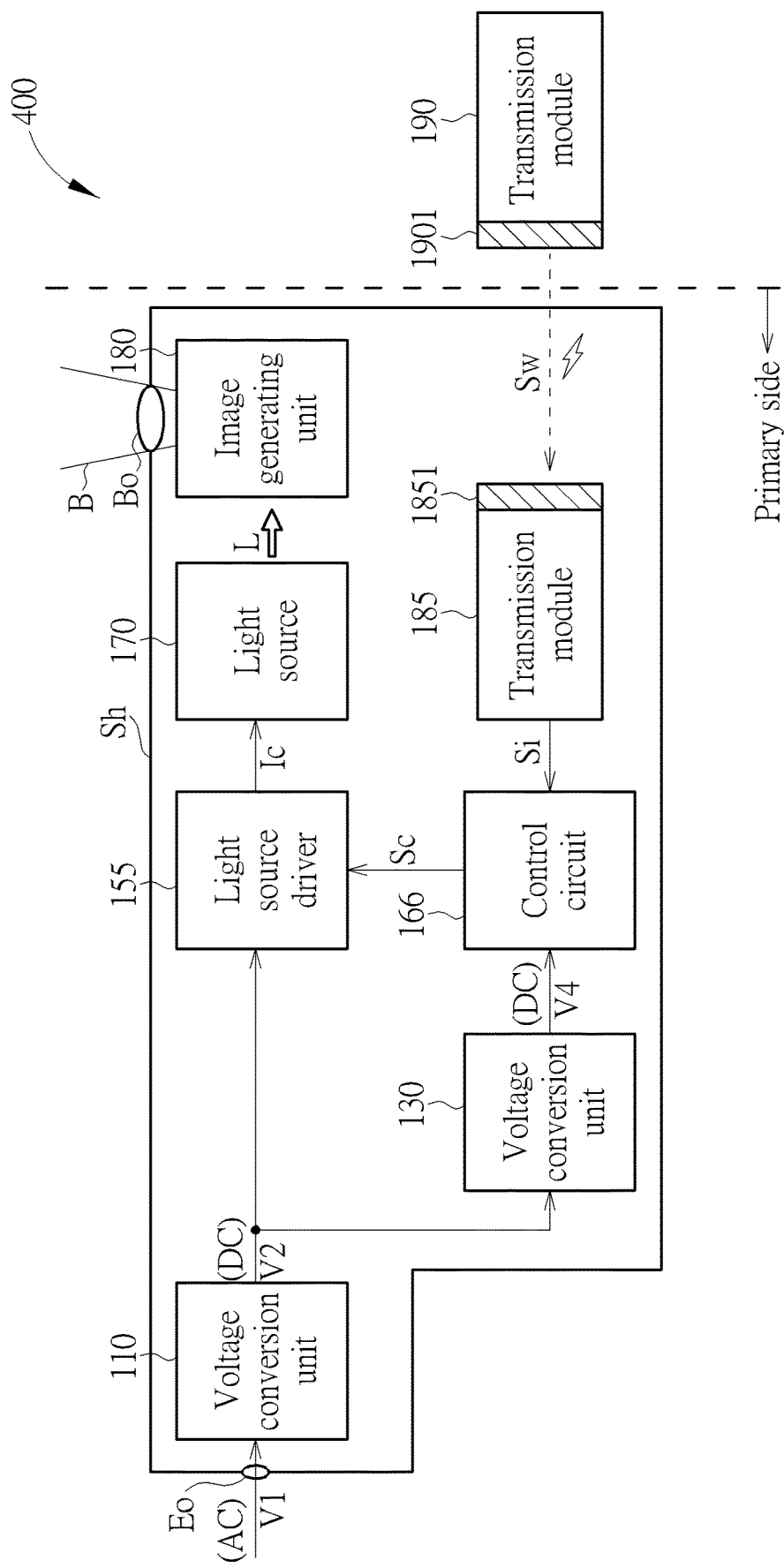
FIG. 4 illustrates a driver circuit according to an embodiment.

FIG. 4 illustrates a driver circuit 400 according to an embodiment. The driver circuit 400 may be similar to the driver circuit 100 of FIG. 1. However, the driver circuit 100 may differ from the driver circuit 400 in that the driver circuit 400 may not include the voltage conversion unit 120 shown in FIG. 1. By selecting a light source driver 155 with a suitable operation voltage, the voltage conversion unit 120 may not be used, the power conversion efficiency may be further increased, and the circuit size may be further reduced. The similarities of FIG. 4 and FIG. 1 are not repeatedly described herein.

For example, the housing Sh shown in FIG. 1 to FIG. 4 may be disposed on a ceiling, and the transmission module 190 may be located on a desk for a user to conveniently couple a mobile device (e.g., mobile phone, tablet computer or laptop computer) to the transmission module 190. The transmission module 190 may be powered using a battery, mains power or a device coupled to the transmission module 190. According to an embodiment, the transmission module 190 may be linked to a mobile device though a wireless path such as a Bluetooth path, a WiFi path or a Zigbee path. As mentioned above, the transmission module 190 itself may be a mobile device with a wireless communication function.

In summary, by means of a driver circuit and a projector provided by embodiments, the circuit inside a housing may be at a primary side, and it may be avoided using voltage conversion units with electrical isolation. Hence, power conversion efficiency may be improved, circuit size and cost may be reduced, and the circuit may comply with related safety regulations to protect users from electric shocks. The disclosure is therefore helpful to reduce engineering problems in the field.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A driver circuit comprising:
a first voltage conversion unit configured to convert a first voltage to a second voltage, the first voltage conversion unit comprising an input terminal configured to receive the first voltage and an output terminal configured to output the second voltage;
a second voltage conversion unit configured to convert the second voltage to a third voltage in a non-electrically isolated manner, the second voltage conversion unit comprising an input terminal configured to receive the second voltage, an output terminal configured to output the third voltage, and a non-isolated voltage converter without two coils separated by an isolation distance;
a third voltage conversion unit configured to convert the second voltage to a fourth voltage in a non-electrically isolated manner, the third voltage conversion unit comprising an input terminal configured to receive the second voltage, an output terminal configured to output the fourth voltage, and a non-isolated voltage converter without two coils separated by an isolation distance;
a light source driver configured to receive the third voltage and a control signal to generate a control current according to the control signal, the light source driver comprising a first terminal coupled to the output terminal of the second voltage conversion unit and configured to receive the third voltage, a second terminal configured to receive the control signal and an output terminal configured to output the control current;
a control circuit configured to receive the fourth voltage and an image signal and generate the control signal according to the image signal, the control circuit comprising a first terminal coupled to the output terminal of the third voltage conversion unit, a second terminal configured to receive the image signal and an output terminal configured to output the control signal;
a first transmission module comprising an output terminal coupled to the second terminal of the control circuit and configured to output the image signal, and a first wireless transmission interface configured to wirelessly receive a wireless image signal, wherein the image signal is generated according to the wireless image signal; and a second transmission module comprising a second wireless transmission interface configured to wirelessly transmit the wireless image signal;

wherein the first voltage conversion unit, the second voltage conversion unit, the third voltage conversion unit, the light source driver and the control circuit are at a primary side, and the first transmission module and the second transmission module are used to insure safety of a user.

2. The driver circuit of claim 1, wherein the first voltage is an alternating-current voltage, and the second voltage, the third voltage and the fourth voltage are direct-current voltages.

3. The driver circuit of claim 1, further comprising:

a light source configured to generate light according to the control current; and an image generating unit configured to generate an image beam by reflecting the light projected onto the image generating unit.

4. The driver circuit of claim 3, further comprising:

a housing comprising a power interface and a light outlet, wherein the power interface is coupled to the input terminal of the first voltage conversion unit and configured to receive the first voltage, and the image beam is projected out of the housing from the light outlet.

5. The driver circuit of claim 1, wherein the second voltage conversion unit comprises a buck voltage converter, a buck-boost voltage converter, a boost-buck voltage converter, a boost voltage converter, a Cuk voltage converter, a SEPIC voltage converter, a ZETA voltage converter or a charge pump voltage converter.

6. The driver circuit of claim 1, wherein the third voltage conversion unit comprises a buck voltage converter, a buck-boost voltage converter, a boost-buck voltage converter, a boost voltage converter, a Cuk voltage converter, a SEPIC voltage converter, a ZETA voltage converter or a charge pump voltage converter.

7. The driver circuit of claim 1, wherein the second transmission module further comprises a connection terminal configured to receive image data for the second transmission module to generate the wireless image signal according to the image data.

* * * * *